(12) United States Patent
Sato

(10) Patent No.: US 8,882,372 B2
(45) Date of Patent: Nov. 11, 2014

(54) CONVEYING DEVICE UTILIZING SUCTION UNIT TO ATTRACT PRINT MEDIUM AND PRINTING APPARATUS USING SAME

(75) Inventor: Takehiro Sato, Chiba (JP)

(73) Assignee: Canon Finetech, Inc., Misato-shi (JP)

( * ) Notice: Subject to any disclaimer, the term of this patent is extended or adjusted under 35 U.S.C. 154(b) by 222 days.

(21) Appl. No.: 13/114,325

(22) Filed: May 24, 2011

(65) Prior Publication Data

US 2011/0293346 A1    Dec. 1, 2011

(30) Foreign Application Priority Data

May 28, 2010    (JP) ................................. 2010-122910

(51) Int. Cl.
*B41J 11/00*    (2006.01)
*B65G 21/20*    (2006.01)
*B41J 13/08*    (2006.01)
*B65H 5/22*    (2006.01)
*B65H 5/38*    (2006.01)

(52) U.S. Cl.
CPC ......... *B65G 21/2036* (2013.01); *B41J 11/0085* (2013.01); *B41J 13/08* (2013.01); *B65H 5/224* (2013.01); *B65H 5/38* (2013.01); *B65H 2404/513* (2013.01); *B65H 2404/61* (2013.01); *B65H 2801/15* (2013.01)
USPC ......................................... 400/578; 347/104

(58) Field of Classification Search
CPC .............. B41J 13/08; B41J 2/01; B41J 11/01; B41J 11/02; B41J 11/00
USPC ........................................... 347/104; 400/578
See application file for complete search history.

(56) References Cited

U.S. PATENT DOCUMENTS 4,216,482 A * 8/1980 Mason .......................... 346/129
4,274,624 A   6/1981 Sato et al.
(Continued)

FOREIGN PATENT DOCUMENTS

| JP | 63-104864 A |   | 5/1988 |               |
|----|-------------|---|--------|---------------|
| JP | 63104864 A  | * | 5/1988 | ... B41J 11/42 |

(Continued)

OTHER PUBLICATIONS

Official Notice of Rejection, dated Apr. 18, 2012, issued by the Japanese Patent Office, in Japanese Patent Application No. 2010-122910. (Translation).

*Primary Examiner* — Nguyen Ha
(74) *Attorney, Agent, or Firm* — Fitzpatrick, Cella, Harper & Scinto

(57) ABSTRACT

The conveying device has contact portions that extend in a conveyance direction of the conveying belt and which contact with the same surface of the print medium that is attracted by suction to the conveying belt. This realizes a conveying device that assures a high quality printing. Even when a print medium with warped or undulated portions is fed, the conveying device can hold the print medium flat on the conveying belt and the ribs by suction through the suction holes in the conveying belt and through the platen, keeping the distance between the print head and the print medium constant, assuring a stable printing operation.

12 Claims, 14 Drawing Sheets

(56) References Cited

U.S. PATENT DOCUMENTS

| | | | |
|---|---|---|---|
| 5,594,486 A * | 1/1997 | Kiyohara | 347/104 |
| 6,406,017 B1 | 6/2002 | Yaneda | |
| 6,453,144 B1 | 9/2002 | Sato | |
| 6,545,255 B2 | 4/2003 | Sato et al. | |
| 7,144,106 B2 * | 12/2006 | Ishii et al. | 347/104 |
| 2007/0132824 A1 * | 6/2007 | Iida et al. | 347/101 |
| 2008/0223512 A1 * | 9/2008 | Sievel | 156/250 |
| 2009/0251521 A1 * | 10/2009 | Arai | 347/104 |
| 2010/0156984 A1 * | 6/2010 | Chikamoto | 347/16 |

FOREIGN PATENT DOCUMENTS

| | | | | |
|---|---|---|---|---|
| JP | 2001-031286 A | 2/2001 | | |
| JP | 2003104600 A * | 4/2003 | | B41J 2/01 |
| JP | 2006-160504 A | 6/2006 | | |
| JP | 2007-302406 | 11/2007 | | |
| JP | 2009-226663 A | 10/2009 | | |

* cited by examiner

CONVEYING DEVICE UTILIZING SUCTION UNIT TO ATTRACT PRINT MEDIUM AND PRINTING APPARATUS USING SAME

BACKGROUND OF THE INVENTION

1. Field of the Invention

The present invention relates to a conveying device that has a conveying means to transport a print medium on a conveying belt by holding it to the belt by suction, and to a printing apparatus using the conveying device.

2. Description of the Related Art

A conveying device that has been proposed in conventional printing apparatus to keep a surface of a print medium from coming into contact with a print head uses a suction device that attracts the print medium to an endless conveying belt by suction.

FIG. 7 is a perspective view of a conveying device disclosed in Japanese Patent Laid-Open No. 2007-302406. An endless conveying belt 41 has a plurality of suction holes piercing therethrough in a direction of the belt thickness and is wound around a drive roller 43 and a follower roller 44, arranged parallel to each other at the same height. On an inner circumferential side of the conveying belt 41 there is provided a platen 42 with a suction chamber formed therein. A negative pressure generating means, such as a fan (not shown), generates a negative pressure in the suction chamber inside the platen 42 to produce a suction force on the surface of the conveying belt 41 through the suction holes in the conveying belt 41. The conveying belt 41 attracts the print medium by the suction force generated as described above.

To perform an accurate printing on a print medium fed onto the conveying belt 41, the printing apparatus needs to detect the front end of the print medium.

FIG. 8 shows a continuous label sheet as an example of print medium. In detecting the front end of a continuous sheet such as shown in the figure and a cut sheet, a method is available which uses a transmission type sensor to detect the front end of the print medium. The transmission type sensor comprises a light emitting portion and a light receiving portion and performs the front end detection by the light from the light emitting portion passing through the label sheet at its base portion 45 but being cut off at a label portion 46.

FIG. 9 shows another example of the continuous sheet, a tag sheet 47 with no area through which the light from the light emitting portion is allowed to pass. As shown in FIG. 9, the tag sheet 47 has marked portions 48 on its print surface, and on the back side the marked portions 48 are coated in advance with a color that absorbs light. The front end detection is made by detecting the state of light of the reflection type sensor that is reflected from the marked portions 48 and from other areas.

In an inkjet printing apparatus required to produce a high quality print, the distance between the print surface of the print medium and the ejection port surface of the print head is desired to be kept as small as possible. This distance needs to be kept at a predetermined short distance in order to maintain a stable printing operation.

In a printing apparatus that prints on a continuous sheet such as a label sheet, a so-called back-feed operation to return the front end of the print medium, after being cut, to the position of the front end detection sensor is required. If the front end detection sensor is installed remote from the print head, the back-feed distance becomes long, raising a possibility of jamming. Further, locating the front end detection sensor remote from the print head also can increase the print medium conveying distance and therefore the size of the conveying device. So, the front end detection sensor needs to be installed near the print head.

Where the transmission type sensor installed near the print head is used to detect the front end of the print medium after the print medium is transported on, and attracted by suction to, the endless conveying belt formed with suction holes, the following problem arises. One of the light emitting portion and the light receiving portion of the transmission type sensor needs to be installed on one surface side of the print medium and the other on the opposite side. So, the light emitting portion must throw light on other than the area of the print medium that is in contact with the conveying belt.

However, the portions of the print medium which are not in contact with the conveying belt may curl or deform due to moisture and the printing operation of the print medium. The curling or deformation can cause the portions of the print medium that are not in contact with the conveying belt 41 to float, with the result that the floating portions may come into contact with the ink ejection port face of the print head. This in turn gives rise to a problem of degraded print quality and possible damages to the print head.

Where the reflection type sensor is used to detect the front end of the print medium, marked portions are provided on the back side of the print medium opposite the print surface to allow the front end detection to be made based on the state of the light reflected from the marked portion and from other areas. So, the reflection type sensor needs to be provided on the back side of the print medium, i.e., on the side where the conveying belt is laid. That is, the sensor detection area of the print medium must not be in contact with the conveying belt, which means that the aforementioned problem can also arise with the reflection type sensor.

Further, although the endless conveying belt can be formed as one integral part, as shown in FIG. 7, a plurality of narrow conveying belts may be arranged parallelly side by side in a direction crossing the conveyance direction for the purpose of reducing the cost. In such a case, the aforementioned problem may also occur in other than the areas where the print medium is not in contact with the conveying belt.

SUMMARY OF THE INVENTION

The present invention has been accomplished to solve the aforementioned problem and provide a conveying device and a printing apparatus using it both of which are capable of high quality printing.

A conveying device of this invention comprises: an endless conveying belt having a plurality of suction holes; a supporting portion to support the conveying belt; and a suction unit to attract a print medium by suction; wherein the conveying belt conveys the print medium by holding it to the conveying belt by the suction unit through the suction holes; wherein the supporting portion has contact portions that extend in a conveyance direction of the conveying belt and which engage with the same surface of the print medium that is attracted by suction to the conveying belt, and groove portions formed between the conveying belt and the contact portions; wherein the suction unit attracts the print medium by drawing air from within spaces in the groove portions.

The printing apparatus of this invention comprises a printing unit for printing on a print medium and the conveying device for conveying the print medium to the printing unit.

With this invention, the contact portions extend in a conveyance direction of the conveying belt and contact with the same surface of the print medium that is attracted by suction to the conveying belt. This construction can realize the conveying device capable of high quality printing.

Also, with this invention, there is provided in the conveying device of the printing apparatus the contact portions that extend in a conveyance direction of the conveying belt and which contact with the same surface of the print medium that is attracted by suction to the conveying belt. This construction can realize the printing apparatus capable of high quality printing.

Further features of the present invention will become apparent from the following description of exemplary embodiments (with reference to the attached drawings).

DESCRIPTION OF THE EMBODIMENTS

<First Embodiment>

Now the first embodiment of this invention will be described by referring to the accompanying drawings.

Figure 1:
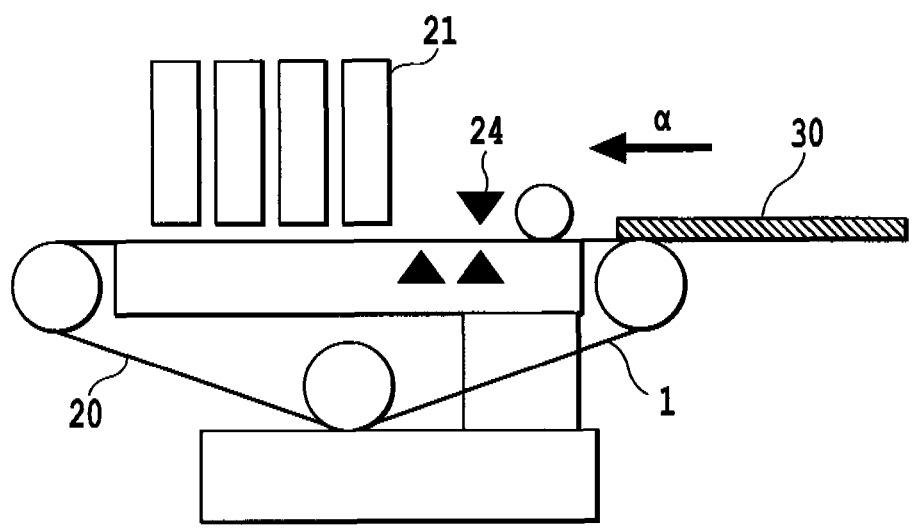
FIG. 1 is a side view showing a construction of a conveying unit and the associated portions in the printing apparatus.

FIG. 1 is a side view of a conveying unit 20 installed in a printing apparatus, one embodiment of this invention. The printing apparatus of this embodiment has a conveying unit 20 with a conveying belt 1 that holds a print medium 30 to it by suction while transporting the print medium, a print head 21 to print on the print medium 30 by ejecting ink onto the print medium as it is conveyed in a direction of arrow a (the direction of a in this embodiment is taken as a direction of conveyance), and a paper feed unit to feed the print medium 30 onto the conveying belt 1.

The print head 21 used here is a line head constructed to be of essentially the same length as a maximum print width of the print medium as measured in a direction crossing the conveyance direction and to have a plurality of nozzles arrayed in line. The print head is not limited to this type but may be of a serial type that moves over the print medium in a direction crossing the print medium conveyance direction for printing. The print medium 30 fed by the paper feed unit onto the conveying unit 20 has its front end detected by a front end detection sensor 24 at which time the printing is initiated at a predetermined position.

Figure 2:
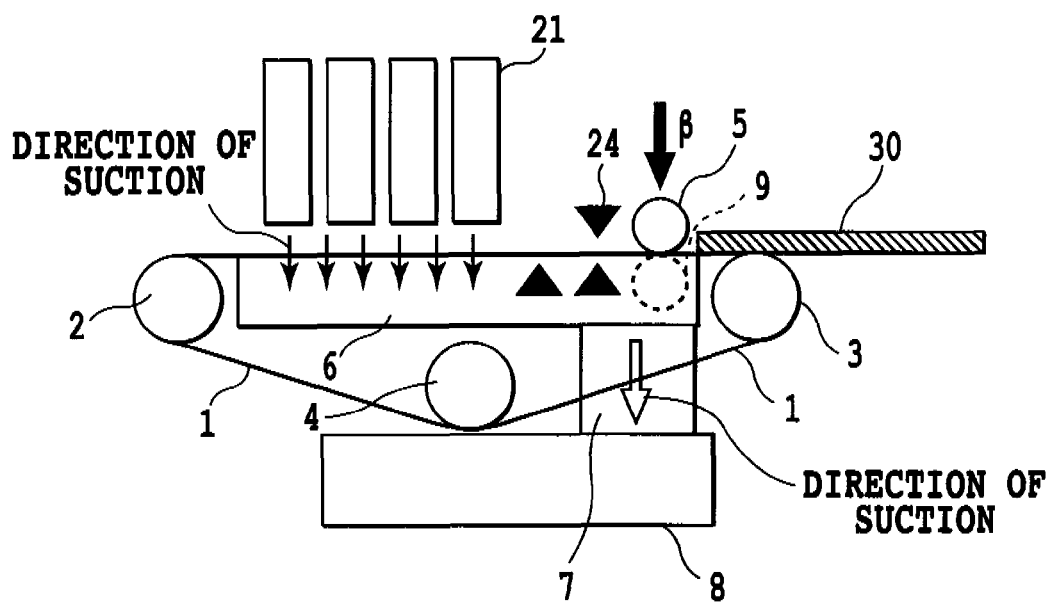
FIG. 2 is a side view showing the construction of the conveying unit.

FIG. 2 is a side view showing the construction of the conveying unit 20. The conveying unit 20 comprises a conveying belt 1 for transporting the print medium 30 fed from the paper feed unit by holding it by suction, a drive pulley 2 coupled to a motor not shown to drive the conveying belt 1, and follower pulleys 3, 4. The conveying belt 1 is tensely wound and rotated around the drive pulley 2 and the follower pulleys 3, 4. Downstream of the follower pulley 3 in the medium conveyance direction there is provided a pinch roller 5 that is pressed against the conveying belt 1 in the direction of arrow β to hold the print medium 30 between it and the conveying belt 1.

On the inner side of the conveying belt 1 there is provided a platen 6 connected to a suction fan 8 through a duct 7. On the opposite side of the conveying belt 1 from the pinch roller 5 is provided a roller 9 that prevents the conveying belt 1 from being dented by the pressing force of the pinch roller 5. Downstream of the pinch roller 5 in the print medium conveyance direction, a front end detection sensor 24 is installed to detect the front end of the print medium 30. With its front end detected, the print medium 30 is printed at a predetermined position by the print head installed in the printing unit.

Figure 3:
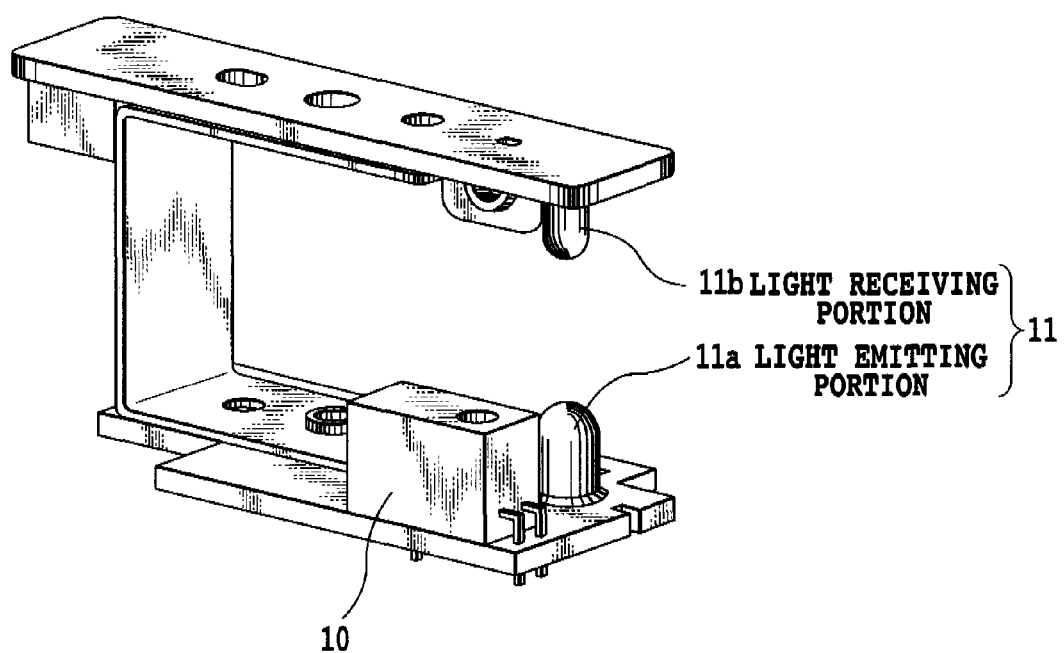
FIG. 3 shows a construction of a front end detection sensor.

FIG. 3 shows the construction of the front end detection sensor 24. The front end detection sensor 24 has a reflection type sensor 10 and a transmission type sensor 11. The transmission type sensor 11 comprises a light emitting portion 11a and a light receiving portion 11b arranged one on each side of the print medium 30 so that they sandwich the print medium in the direction of thickness of the print medium. When the print medium 30 is not present, the light emitted from the light emitting portion 11a of the transmission type sensor 11 reaches the light receiving portion 11b. When, however, the print medium 30 arrives at the transmission type sensor 11, the light emitted from the light emitting portion 11a is interrupted by the print medium 30 and cannot reach the light receiving portion 11b. The front end of the print medium 30 can thus be detected by the level of strength of the light received at the light receiving portion 11b.

The reflection type sensor 10 is used to detect a front end of a continuous sheet, such as tag paper, with no area that allows light from the light emitting portion to pass therethrough. The reflection type sensor 10 has constructed as one integral sensor the light emitting portion and the light receiving portion that receives light reflected from the print medium. When the print medium 30 is a tag sheet, a surface of the print medium opposite the print surface is printed with a mark in advance. The reflection type sensor 10 bases the front end detection on the difference in the strength of reflected light between the marked portion and the other area.

Figure 4:
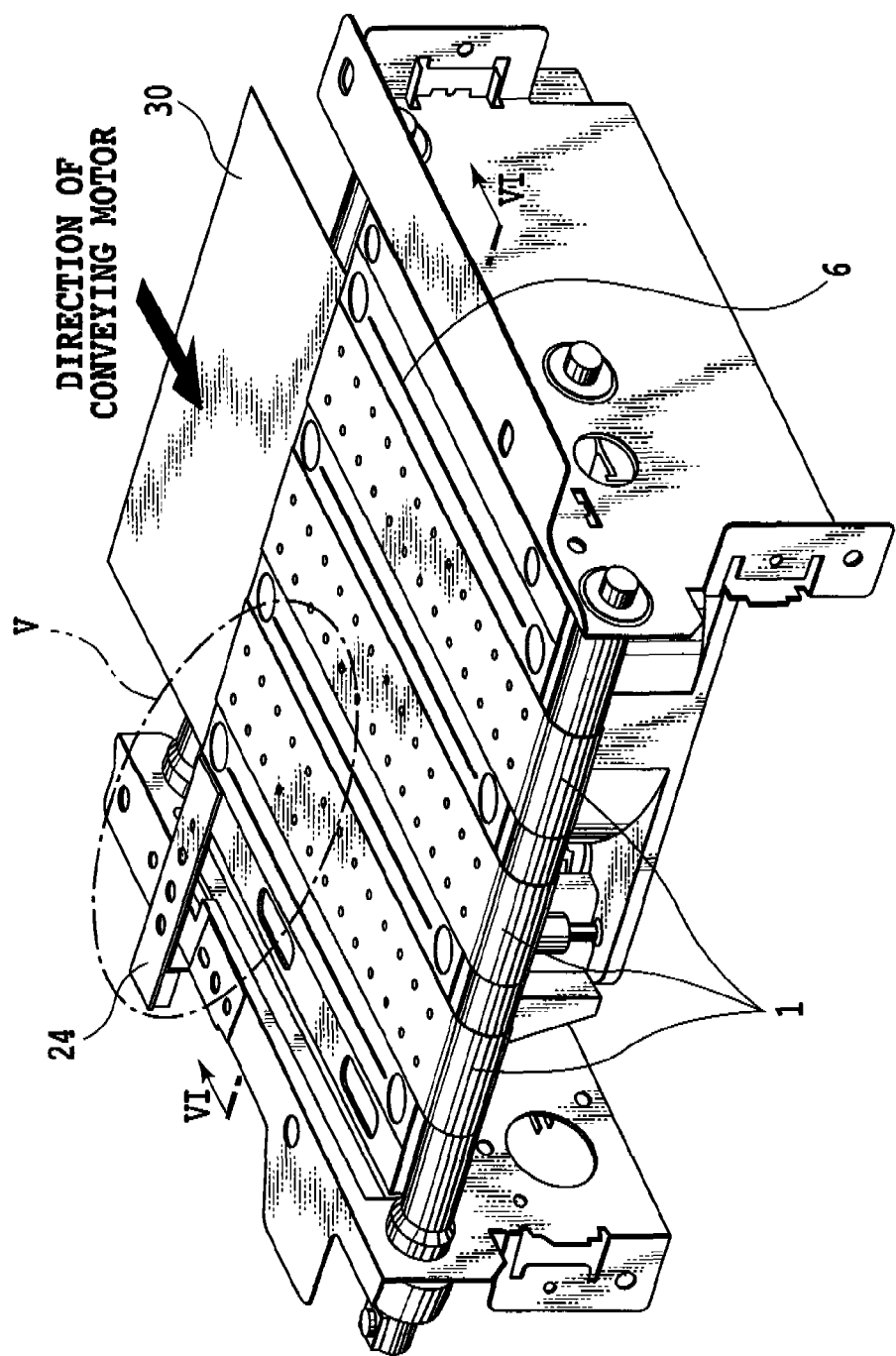
FIG. 4 is a perspective view of the conveying unit of this invention.

FIG. 4 is a perspective view of the conveying unit in the first embodiment of this invention. In this embodiment, three conveying belts 1 are used. The number of the conveying belts 1 is determined according to the maximum width of the print medium 30 and may be increased or decreased as appropriate. A single conveying belt 1 may also be used. The printing apparatus of this embodiment is so constructed that the printing operation is done by taking one side edge of the print medium as a reference for printing. That is, the print medium is conveyed by having one of its edges in a direction crossing the conveyance direction (print medium widthwise direction) aligned with the reference.

The front end detection sensor 24 is installed on the reference edge side of the print medium 30 (i.e., on the side of one lateral edge of the print medium which is taken as a reference in the print medium widthwise direction) and near the upstream end of the conveying belt in the conveyance direction. The front end detection sensor 24 is also situated upstream of the print head 21 in the conveyance direction. The print medium 30 is conveyed with its portion to be detected by the front end detection sensor 24 floated from the upper surface of the conveying belt 1. The conveying belt 1 is supported on the platen 6. The print medium 30 is conveyed as the conveying belt 1 slides on the platen 6.

Figure 5:
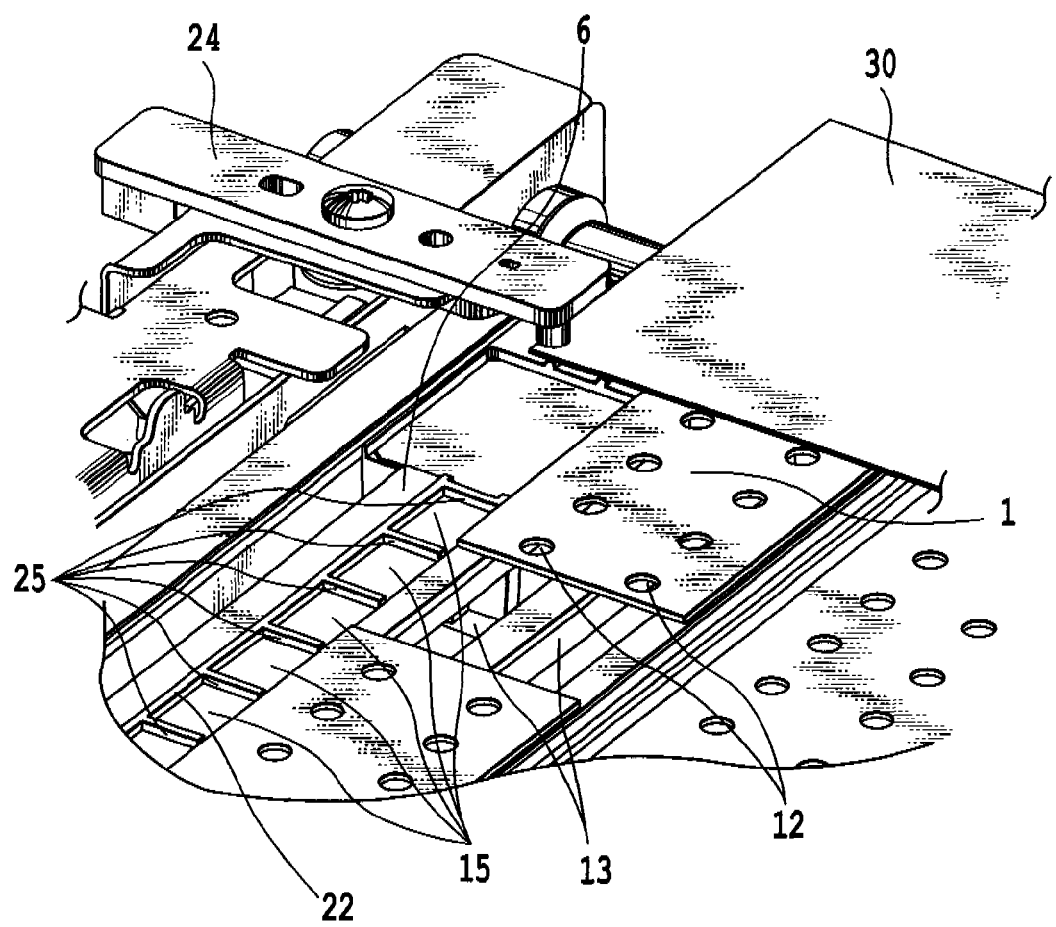
FIG. 5 shows details of portion V in FIG. 4 in a first embodiment of this invention.

FIG. 5 shows details of a portion V in FIG. 4. The endless conveying belt 1 is formed with a plurality of suction holes 12 over its entire circumference, the individual suction holes 12 piercing the conveying belt 1 in a direction of its thickness. Arrays of suction holes 12 are provided at equal intervals in the widthwise direction of the conveying belt 1. A belt supporting portion of the platen 6 is formed with depressurization slots 13 that extend uninterrupted in the conveyance direction and are located at positions aligned with each array of the suction holes 12 of the conveying belt 1. So, there is no possibility of the suction of air being interrupted as the conveying belt 1 travels in the conveyance direction. The suction fan 8 is operated to depressurize the depressurization slots 13, holding the print medium 30 to the conveying belt 1 by the suction of air through the suction holes 12 and the depressurization slots 13.

The front end detection sensor 24 is installed on the reference edge side of the print medium 30 and near the end of the conveying belt 1. The print medium 30 is conveyed with its portion to be detected by the front end detection sensor 24 overhanging from the upper surface of the conveying belt 1. That is, that area of the print medium on the reference edge side which is out of contact with the conveying belt 1 constitutes the portion to be detected by the front end detection sensor 24. Where the front end detection sensor 24 is installed the platen 6 is formed with a detection window 23 through which the light emitted from the front end detection sensor 24 passes. The portion of the print medium 30 overhanging from the upper surface of the conveying belt 1 is made to travel over the detection window 23. Denoted 15 are groove portions that will be described later. Reference number 22 represents ribs and 25 widthwise ribs described later.

Figure 6:
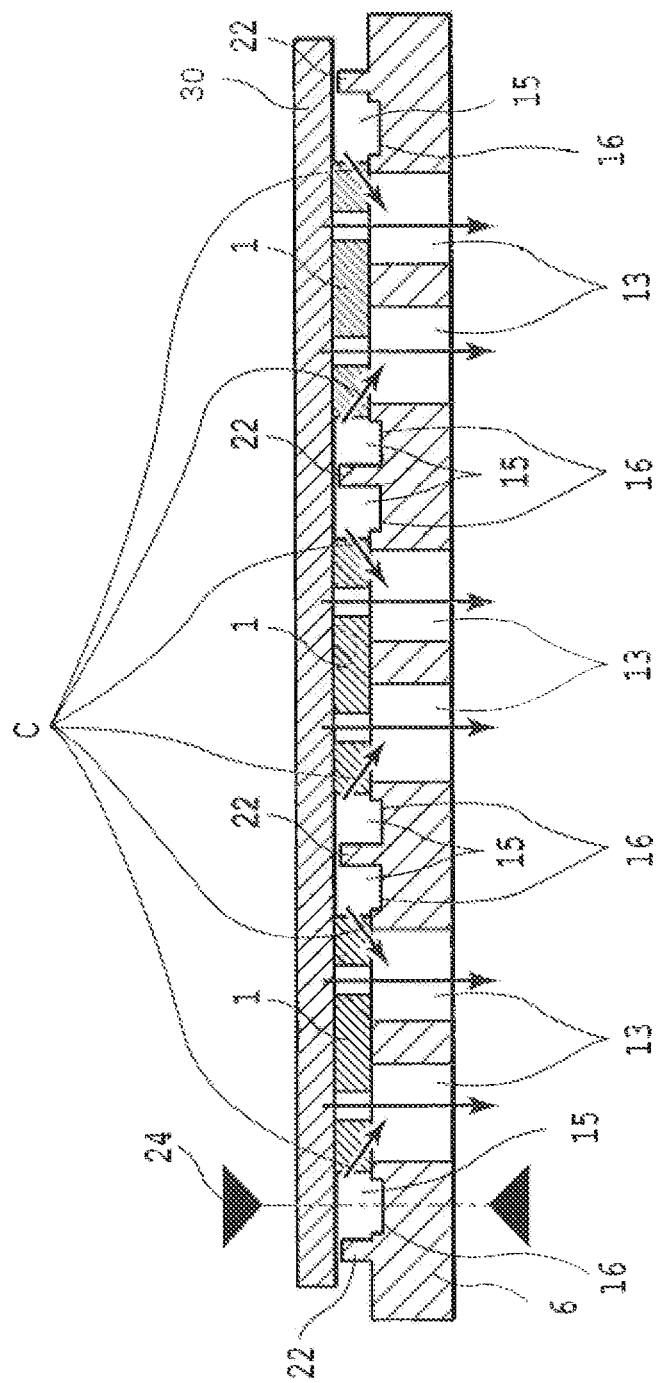
FIG. 6 is a cross section taken along the line VI-VI of FIG. 4 in the first embodiment.
Figure 7:
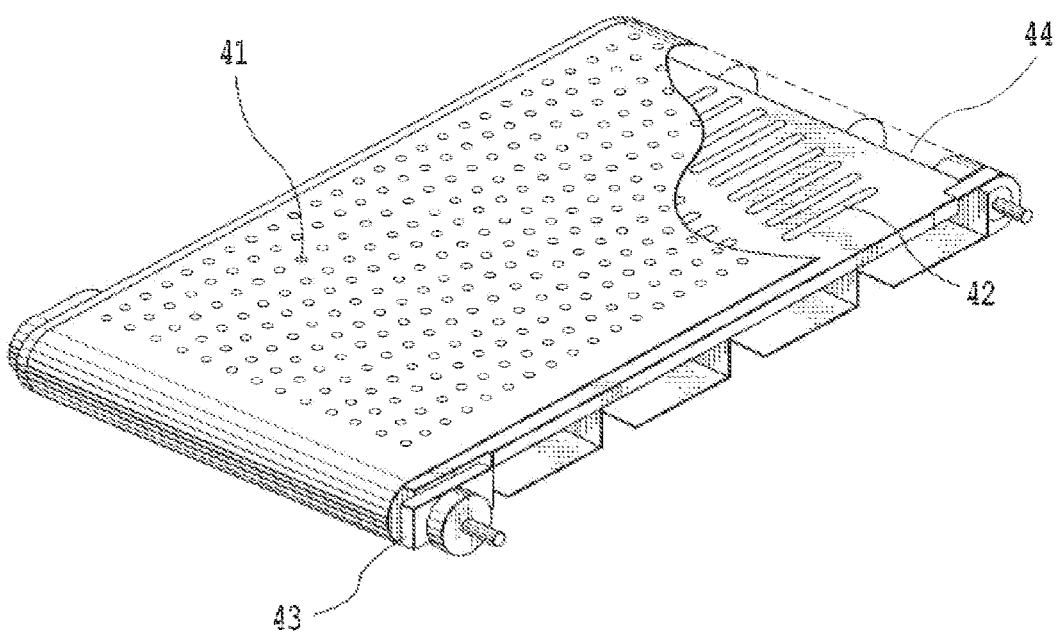
FIG. 7 is a perspective view of a conventional conveying device.
Figure 8:
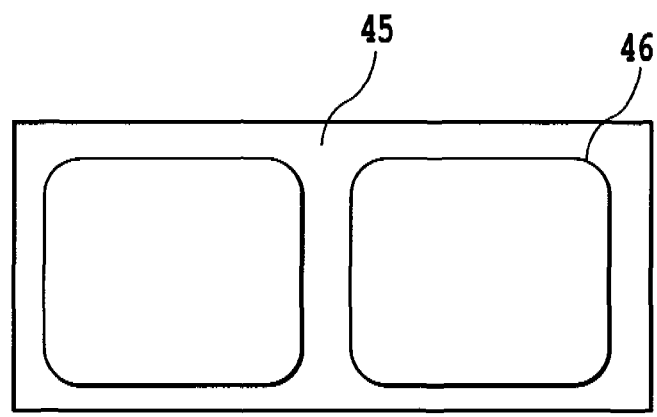
FIG. 8 shows a continuous sheet such as a label sheet.
Figure 9:
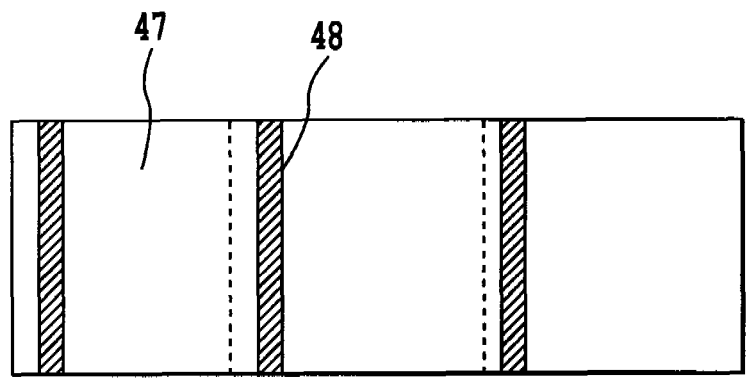
FIG. 9 shows a continuous sheet with no area that allows light from a light emitting portion to pass therethrough.

FIG. 6 shows a cross section taken along the line VI-VI in FIG. 4 (cross section taken along the print medium widthwise direction). The conveying belt 1 travels in contact with the platen 6. The platen 6 is provided with a plurality of ribs 22 extending in the conveyance direction that function as contact portions, on the upper surface (contact surface) of which the print medium 30 is supported as it is conveyed. The ribs 22 are arranged between the adjacent conveying belts 1. The ribs 22 are also provided on both the reference edge side and the opposite edge side of a group of the conveying belts 1 with respect to the print medium widthwise direction so that they can support the widthwise edge portions of the print medium 30 that are overhanging from the conveying belt 1.

The ribs 22 prevent the print medium 30 from deflecting down excessively between the adjacent conveying belts 1 and at those print medium portions overhanging from the group of the conveying belts 1. The ribs 22 are so constructed that their contact surface that supports the print medium is slightly lower in a direction normal to a print medium transport surface of the conveying belts 1 than the transport surface of the conveying belts 1 (i.e., the surface of the conveying belts 1 that attracts the print medium by suction). If the contact surface of the ribs 22 is set higher than the print medium transport surface of the conveying belt 1, when a print medium 30 to be conveyed has a flatness of near zero and is stiffer than a paper sheet, such as a plastic sheet, a gap may be formed between the conveying belts 1 and the print medium 30, resulting in the print medium failing to be held to the conveying belts 1 by suction. This problem can be eliminated by setting the height of the ribs 22 slightly lower than the print medium transport surface of the conveying belts 1.

The platen 6 is formed with groove portions 15 between the ribs 22 and the conveying belts 1. Denoted 16 are recessed bottom portions that are lower in a direction normal to the print medium transport surface of the conveying belts 1 than the contact surface of the ribs 22 and the transport surface of the conveying belts 1. The groove portions 15 are enclosed spaces each defined by the recessed bottom portion 16, the conveying belt 1 and the rib 22. The groove portions 15 are so constructed that the enclosed spaces can be maintained even when the print medium 30 contacts the conveying belts 1 and the ribs 22. With the groove portions 15 formed as described above, when the suction fan 8 is operated to attract the print medium to the conveying belt 1 by suction through the depressurization slots 13 and the suction holes 12, air flows from within the groove portions 15 through gaps between the conveying belts 1 and the platen 6 into the depressurization slots 13 (in directions of arrow C of FIG. 6).

With the air in the groove portions 15 flowing into the depressurization slots 13, a pressure lower than the atmospheric pressure is produced in the groove portions 15. The reduced pressure then causes the areas of the print medium 30 remaining out of contact with the conveying belt 1 to be drawn toward the platen 6. As described above, the provision of the groove portions 15 allows the side edge portions of the print medium 30 overhanging from the conveying belt 1 to be held to the ribs 22 by suction. As shown in FIG. 5, the ribs 22 may be connected with the widthwise ribs 25 extending in the widthwise direction of the print medium to form box spaces, which may be located below the print head 21.

Figure 10:
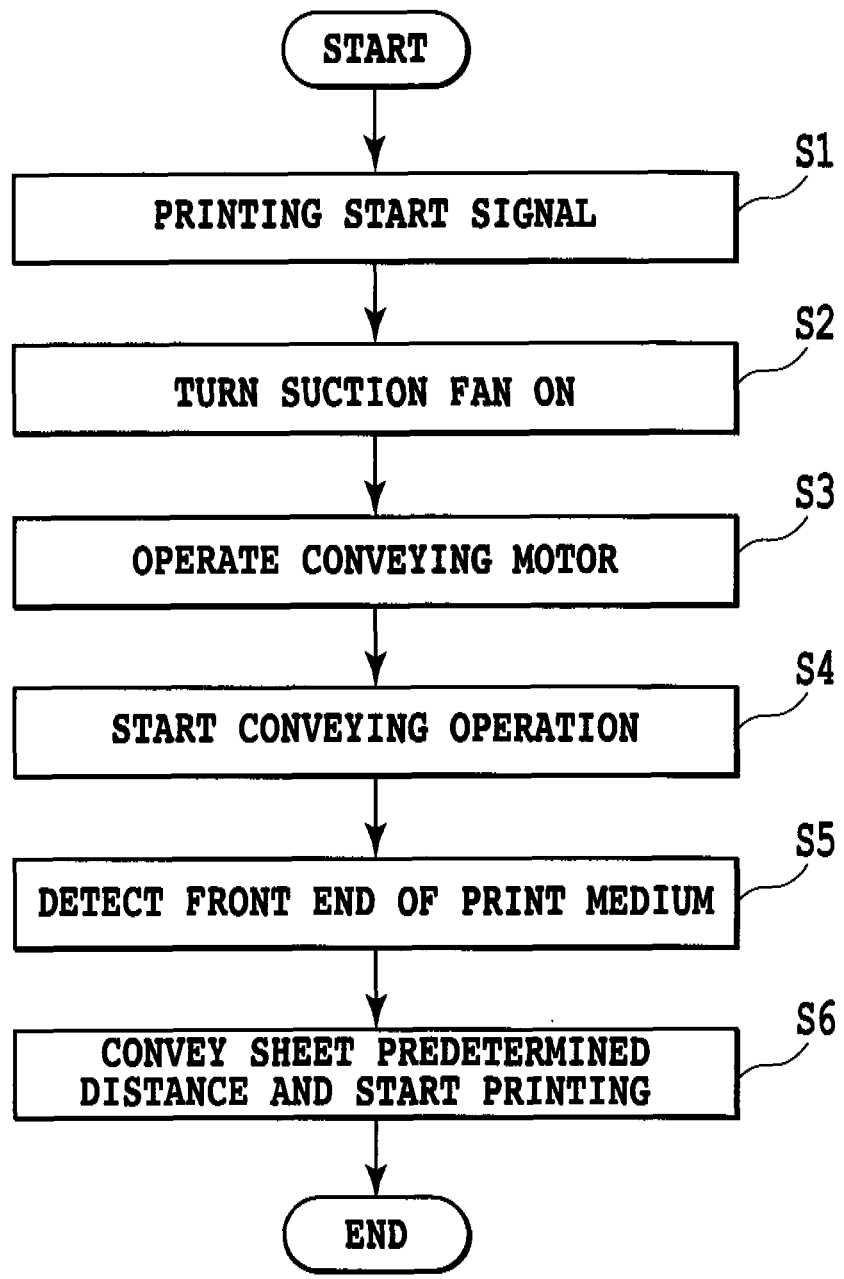
FIG. 10 is a flow chart for controlling the conveying unit during a continuous printing operation in the first embodiment.

The provision of the widthwise ribs 25, arranged as described above, allows those areas of the print medium traveling underneath the print head 21 which overhang from the conveying belt 1 to be held effectively to the widthwise ribs 25 by suction. FIG. 10 is a flow chart for the control of the conveying unit 20 when a continuous printing operation is performed in the printing apparatus of this embodiment. By referring to this flow chart, the control of the conveying unit 20 will be explained. When at step S1 the user issues a print start signal, the suction fan is turned on at step S2, followed by the conveying motor in the drive unit being operated at step S3 and sheets of the print medium beginning to be fed at step S4. Then at step S5 the front end detection sensor detects the front end of the print medium held to the conveying belt 1 by suction and at step S6 the print medium is advanced a predetermined distance, at which time the printing operation is initiated.

Figure 11:
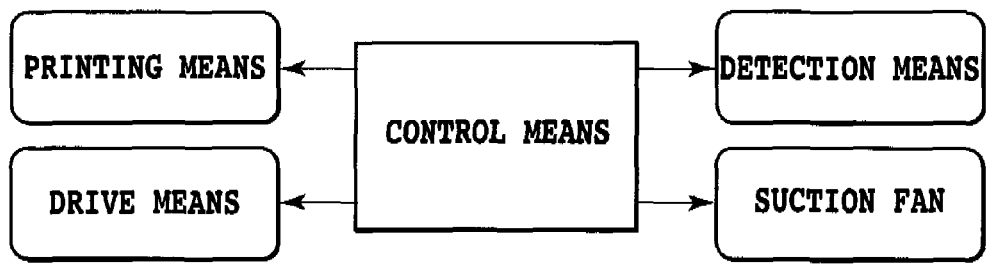
FIG. 11 is a block diagram showing a control means in the first embodiment.

FIG. 11 is a block diagram showing a control means in this invention. The drive means, the suction fan and the front end detection sensor in the conveying unit, and the printing means are connected to and controlled by the control means.

As described above, even when a print medium with warped or undulated portions is fed, it can be held flat to the conveying belt and the ribs by suction through the suction holes in the conveying belt and through the platen, keeping the distance between the print head and the print medium constant, assuring a stable printing operation. This in turn ensures a high quality printing and realizes a conveying device that can prevent possible damages to the print head and a printing apparatus using such a conveying device.

<Second Embodiment>

The second embodiment differs from the first embodiment in that suction holes 14 are formed in the platen 6. In other respects, it is identical with the first embodiment and detailed explanations are omitted.

Figure 12:
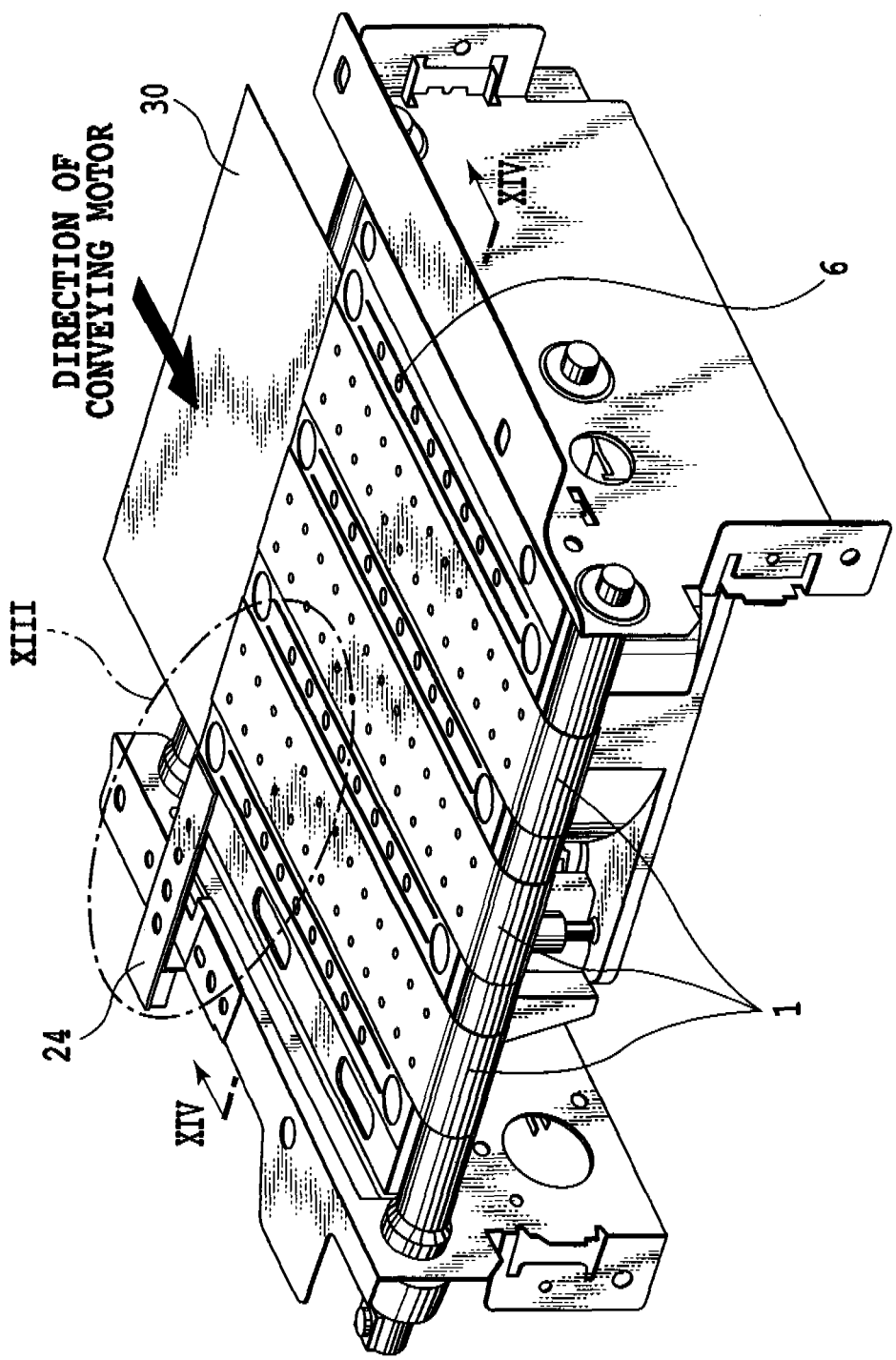
FIG. 12 is a perspective view of the conveying unit in the second embodiment.
Figure 13:
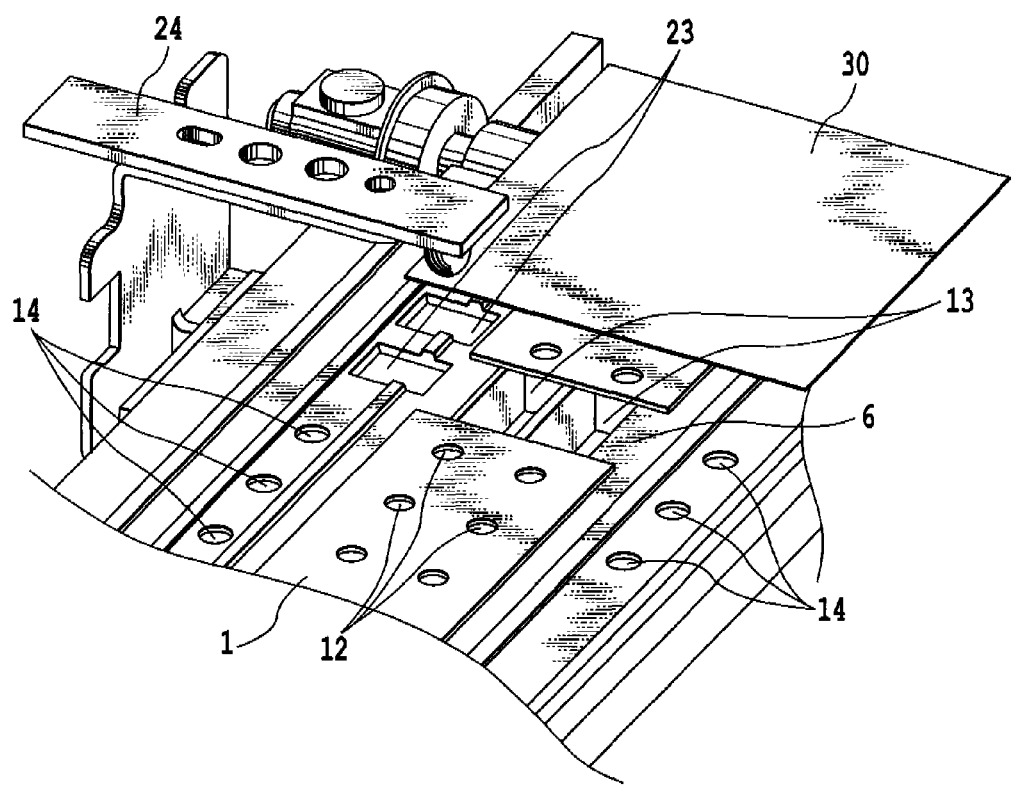
FIG. 13 shows details of portion XIII in FIG. 12.

FIG. 12 is a perspective view of the conveying unit in the second embodiment of this invention. FIG. 13 shows details of the portion XIII in FIG. 12. The platen 6 is formed with the suction holes 14 that extend through the bottom of the groove portions 15 in a direction perpendicular to the sliding surface of the conveying belt 1 so as to attract by suction those portions of the print medium 30 which overhang from the conveying belt 1. These suction holes 14 are lined near and along the side edges of the conveying belt 1. The suction holes 14 are provided downstream of the front end detection sensor 24 in the conveyance direction and can attract by suction those portions of the print medium 30 that are outside the conveying belt 1. In this embodiment, there are three conveying belts 1, so that the suction holes 14 are shown provided on both sides of each conveying belt in the figure. If only one conveying belt 1 is used, the suction holes 14 may be provided on only one side of the conveying belt 1.

Figure 14:
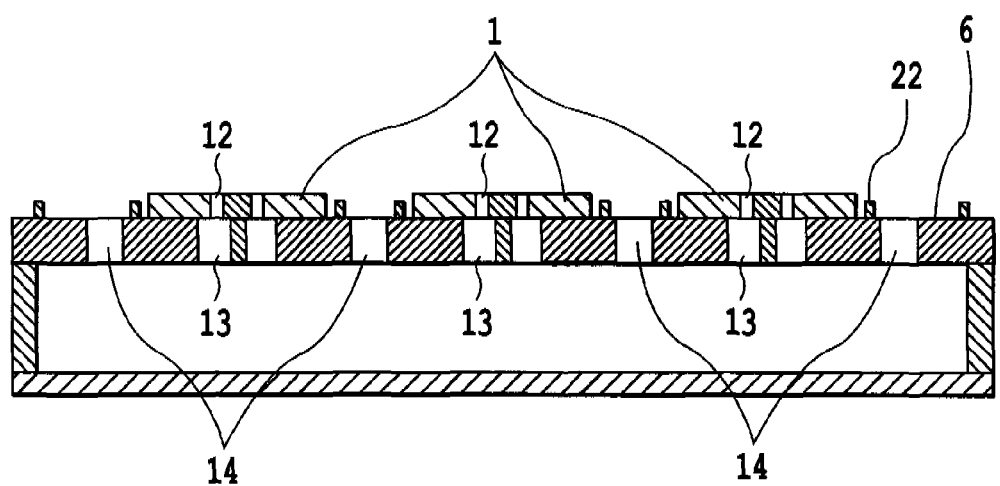
FIG. 14 is a cross section taken along the line XIV-XIV of FIG. 12.

FIG. 14 shows a cross section taken along the line XIV-XIV in FIG. 12. When the print medium 30 is attracted toward the suction holes 14, it does not come into contact with the suction holes 14 because the print medium 30 is supported on the ribs 22.

As described above, even when a print medium with warped or undulated portions is fed, it can be held flat to the conveying belt and the ribs by suction through the suction holes in the conveying belt and the platen, keeping the distance between the print head and the print medium constant, assuring a stable printing operation. This in turn ensures a high quality printing and realizes a conveying device that can prevent possible damages to the print head and a printing apparatus using such a conveying device.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-122910, filed May 28, 2010, which is hereby incorporated by reference herein in its entirety.

What is claimed is:

1. A conveying device comprising:
an endless conveying belt having a plurality of suction holes;
a supporting portion to support the conveying belt;
a suction unit to attract a print medium to the conveying belt by suction; and
a detecting portion to detect the print medium,
wherein the conveying belt conveys the print medium while the suction unit holds the print medium to the conveying belt through the suction holes,
wherein the supporting portion has a contact portion that extends in a conveyance direction of the conveying belt and which contacts with a surface of the print medium that is attracted by suction to the conveying belt, a groove portion formed between the conveying belt and the contact portion, and a divisional portion that divides the groove portion into plural spaces,
wherein the suction unit attracts the print medium by drawing air through the suction holes and from the spaces,
wherein a detecting position where the print medium is detected by the detecting portion is set in an area where the conveying belt is disposed relative to the conveyance direction and where the conveying belt is not disposed relative to a direction orthogonal to the conveyance direction, and
wherein the divisional portion is disposed in a position which is different from the detecting position, and the contact portion is disposed in a position which is different from the detecting position.

2. A conveying device according to claim 1, wherein suction holes to attract the print medium by suction are provided in the groove portion along the conveyance direction of the conveying belt.

3. A conveying device according to claim 2, wherein the suction holes which are provided in the groove portion are provided on one or both sides of the conveying belt with respect to a direction crossing the conveyance direction.

4. A conveying device according to claim 1, wherein the conveying belt comprises a plurality of belts.

5. A conveying device according to claim 1, wherein contact surfaces of the contact portions that contact with the print medium are set lower in a direction normal to a surface of the conveying belt attracting the print medium by suction than the surface of the conveying belt.

6. A conveying device according to claim 1, wherein a transmission type sensor or reflection type sensor is used to detect the print medium.

7. A printing apparatus having a printing unit for performing a printing operation on a print medium and the conveying device of claim 1 for conveying the print medium to the printing unit.

8. A conveying device comprising:
an endless conveying belt;
a supporting portion to support the conveying belt;
a suction unit to attract a print medium to the conveying belt by suction, wherein the conveying belt conveys the print medium; and
a detecting portion to detect the print medium,
wherein the supporting portion has a contact portion that extends in a conveyance direction of the conveying belt and which contacts with a surface of the print medium which is the surface of the print medium contacting with the conveying belt, a groove portion formed between the conveying belt and the contact portion, and a divisional portion that divides the groove portion into plural spaces,
wherein a detecting position where the print medium is detected by the detecting portion is set in an area where the conveying belt is disposed relative to the conveyance direction and where the conveying belt is not disposed relative to a direction orthogonal to the conveyance direction, and
wherein the divisional portion is disposed in a position which is different from the detecting position, and the contact portion is disposed in a position which is different from the detecting position.

9. A conveying device comprising:
an endless conveying belt;
a supporting portion to support the conveying belt;
a suction unit to attract a print medium to the conveying belt by suction; and
a detecting portion to detect the print medium,
wherein the conveying belt conveys the print medium,
wherein the supporting portion has a contact portion that extends in a conveyance direction of the conveying belt and which contacts with a surface of the print medium which is the surface of the print medium contacting with the conveying belt, and a groove portion formed between the conveying belt and the contact portion, and
wherein the suction unit attracts the print medium by drawing air from the groove portion, wherein a detecting position where the print medium is detected by the detecting portion is set in an area where the conveying belt is disposed relative to a conveyance direction of the print medium by the conveying belt and where the conveying belt is not disposed relative to a direction orthogonal to the conveyance direction, wherein the contact portion is disposed in a position which is different from the detecting position.

10. A conveying device comprising:

an endless conveying belt;

a supporting portion to support the conveying belt;

a suction unit to attract a print medium to the conveying belt by suction; and a detecting portion to detect the print medium, wherein the conveying belt conveys the print medium, wherein the supporting portion has a contact portion that extends in a conveyance direction of the conveying belt and which contacts with a surface of the print medium which is the surface of the print medium contacting with the conveying belt, a groove portion formed between the conveying belt and the contact portion, and a divisional portion that divides the groove portion into plural spaces, wherein the suction unit attracts the print medium by drawing air from the plural spaces, wherein a detecting position where the print medium is detected by the detecting portion is set in an area where the conveying belt is disposed relative to a conveyance direction of the print medium by the conveying belt and where the conveying belt is not disposed relative to a direction orthogonal to the conveyance direction, and wherein the divisional portion is disposed in a position which is different from the detecting position.

11. A conveying device according to claim 10, wherein the contact portion is arranged in a position which is different from the detecting position.

12. A conveying device comprising:

an endless conveying belt;

a supporting portion to support the conveying belt;

a suction unit to attract a print medium to the conveying belt by suction; and a detecting portion to detect the print medium, wherein the conveying belt conveys the print medium, and wherein a suction area to attract the print medium by the suction unit and a detecting position where the print medium is detected by the detecting portion are set in an area where the conveying belt is disposed relative to the conveyance direction of the print medium by the conveying belt and where the conveying belt is not disposed relative to a direction orthogonal to the conveyance direction.

\* \* \* \* \*